J. A. Talpey.
Hand Saw Mach.
N° 35,790.        Patented July 1. 1862.
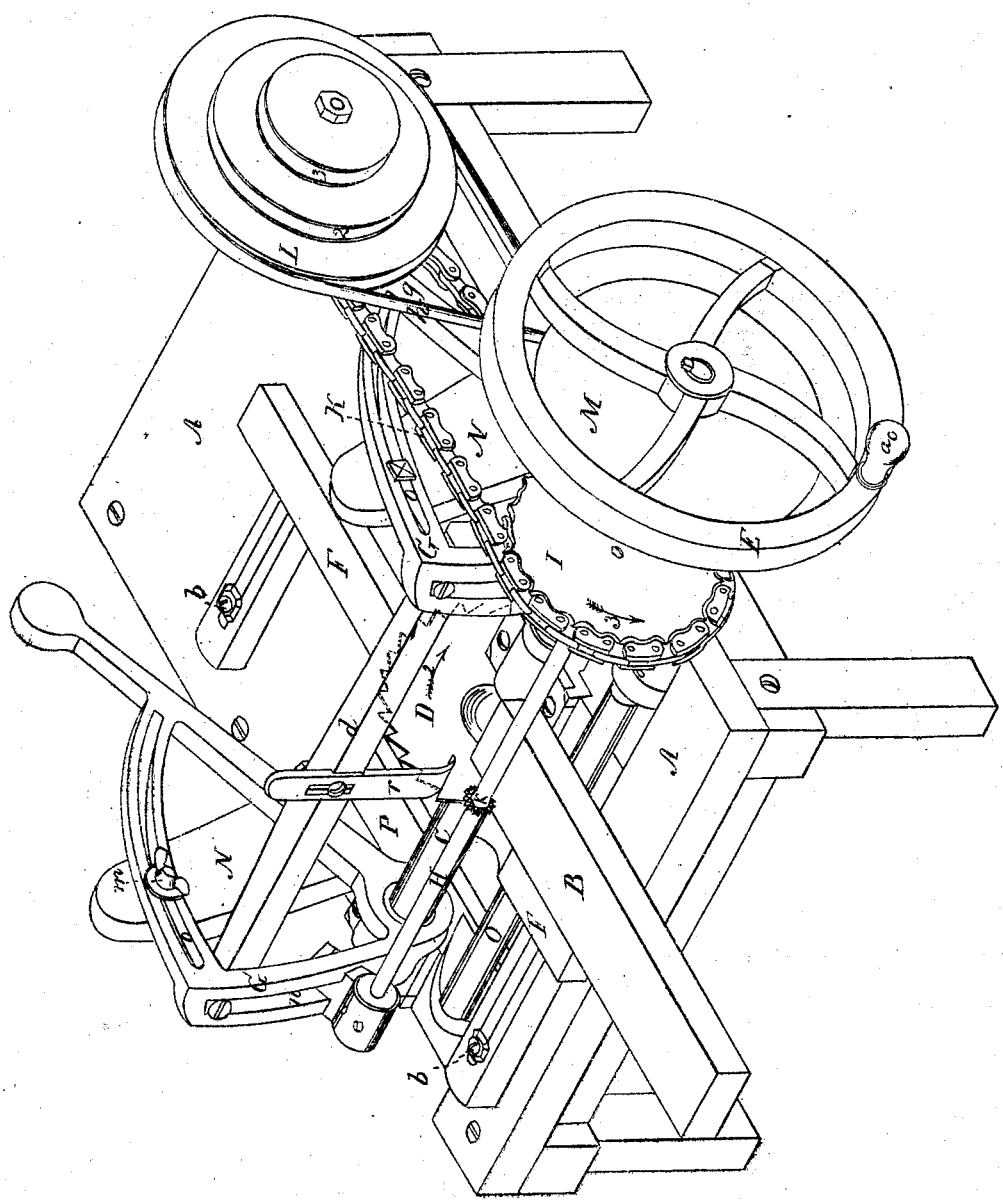
WITNESSES.
Edmund Mason
P. E. Teschemacher
Inventor:
Joseph A. Talpey
by his attorney
Samuel Cooper
N. Roach

UNITED STATES PATENT OFFICE.

JOSEPH A. TALPEY, OF SOMERVILLE, MASSACHUSETTS.

IMPROVEMENT IN HANDSAWING-MACHINES.

Specification forming part of Letters Patent No. 35,790, dated July 1, 1862.

*To all whom it may concern:*

Be it known that I, JOSEPH A. TALPEY, of Somerville, in the county of Middlesex and State of Massachusetts, have invented certain Improvements in Handsawing-Machines for Sawing Lumber, of which the following is a full, clear, and exact description, reference being had to the accompanying drawing, making part of this specification, in which is represented in perspective a hand or bench sawing-machine for slitting up small stuff.

Carpenters and builders frequently employ what they term a "hand" or "bench" sawing machine, with which they slit up boards and small stuff, a circular saw being driven rapidly by hand or by a foot-treadle, and the stuff being pushed or fed up against the saw, which revolves toward the stuff being cut. Here considerable power is required to revolve the saw to make it cut against the grain of the wood and against the feed, and also to feed the stuff against the saw. In most of such machines the saw is speeded up to make it cut better against the grain of the wood.

My present invention consists in arranging the saw to cut with or in the direction of the grain of the wood, and thus using the saw to feed forward the stuff being cut, in combination with a check-roll and its gearing, which prevents the stuff from being dragged onto the saw so fast as to choke it, as is liable sometimes to be the case, as hereinafter described.

That others skilled in the art may understand and use my invention, I will proceed to describe the manner in which I have carried it out.

In the said drawing, A is the bench or frame of the machine, on which the lumber B to be cut rests. A shaft, C, has its bearings in the side rails of the frame and carries the circular saw D, which is revolved in the direction of the arrow 2 by the handle $a$ and fly-wheel E on the outer end of the shaft. A rest, F, held by set-screws $b$ to the top of the bench, guides the stuff B. A frame or double quadrant, G, pivoted at both ends on the shaft C and braced by a cross-bar, $d$, carries in bearings $e$ a shaft, H, which has attached to it at one end a sprocket-wheel, I, round which passes a "machine-chain," K, which is then led over a toothed pulley on the back of the pulley L, which is supported on a short shaft, $f$, projecting from the arm $g$ of the quadrant-frame G. A cord, $h$, from the pulley L is crossed and passes round a pulley, M, on the saw-shaft C, the relative sizes of the pulleys L and M being such that the shaft H shall be revolved in the direction of the arrow 3 just as fast as it is desired that the board B shall be drawn through by the saw. A small toothed wheel, $k$, is secured to the shaft H in line with the cut of the saw. The pulleys have several grooves, 1 2 3, and by changing the cord $h$ to a different groove the rate of feed may be varied. The quadrant-frame G is vibrated on its bearings to bring the toothed wheel $k$ down onto the board B. It is then secured in position by thumb-nuts $m$ on bolts which pass through standards N and through slots $o$ in the quadrants. The bearings $e$ of the shaft H are adjustable in slots $n$, to be used when required by a great variation of the thickness of the stuff to be cut. The pulley L being hung on the arm of the frame G, the tension of the cord $h$ will not be affected by the change of position of this frame. A presser-roll, O, hung on springs P, bears up against the under side of the board B and keeps it in contact with the toothed wheel $k$. A stop, $r$, is attached to the cross-bar $d$ to prevent the end of the board from flying up when it is cut through.

I find that with the machine above described I am enabled to do a larger amount of work than with any handsawing machine with which I am acquainted, and with a less expenditure of power.

What I claim as my invention, and desire to secure by Letters Patent, is—

The saw D, having its teeth constructed as represented and arranged with its axis below the table, so as to cut with the grain of the wood, and thus draw forward the material being cut, in combination with the toothed wheel $k$ and its operating mechanism, which will, by their positive regular feeding action, prevent the saw from being choked by its own tendency to draw the material forward, in the manner and substantially as specified.

JOSEPH A. TALPEY.

Witnesses:
 THOS. R. ROACH,
 P. E. TESCHEMACHER.